INVENTOR.
BY
ATTORNEY.

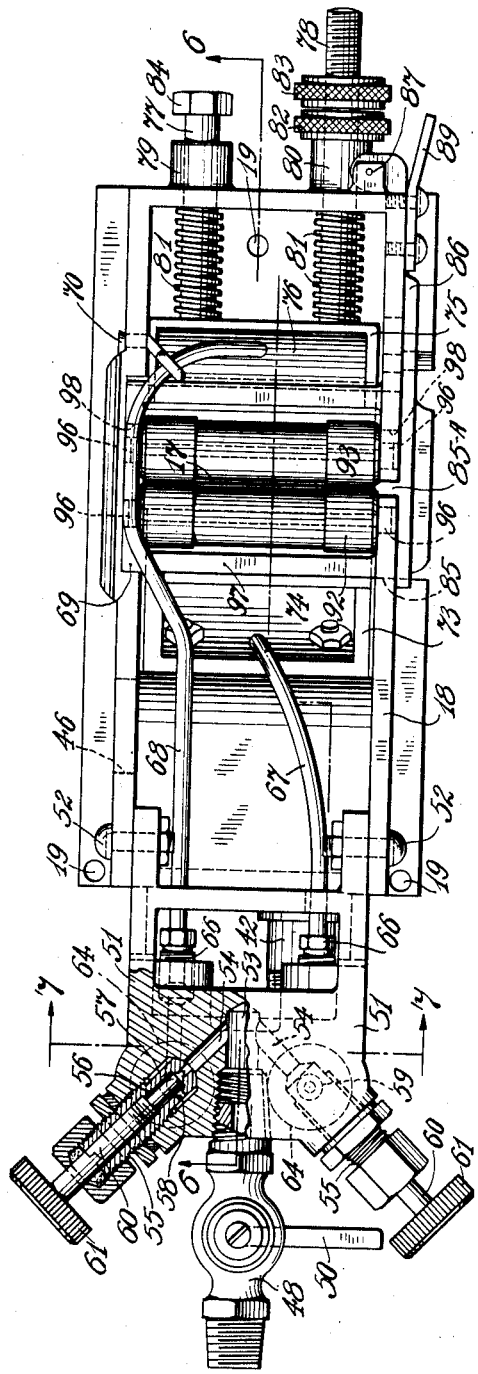
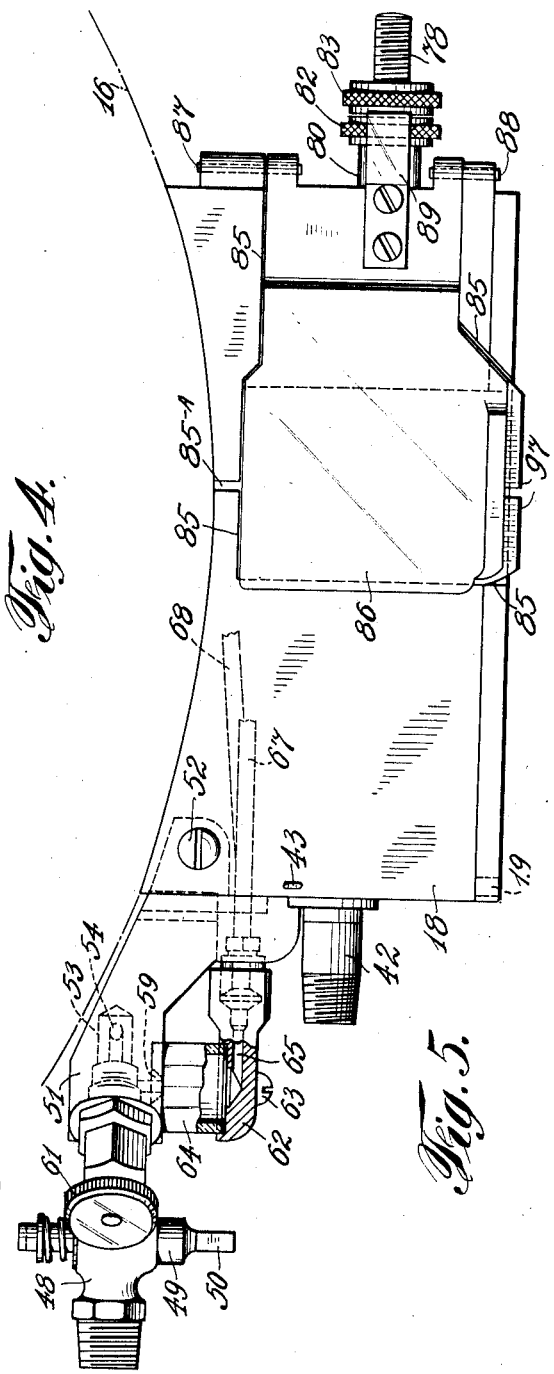

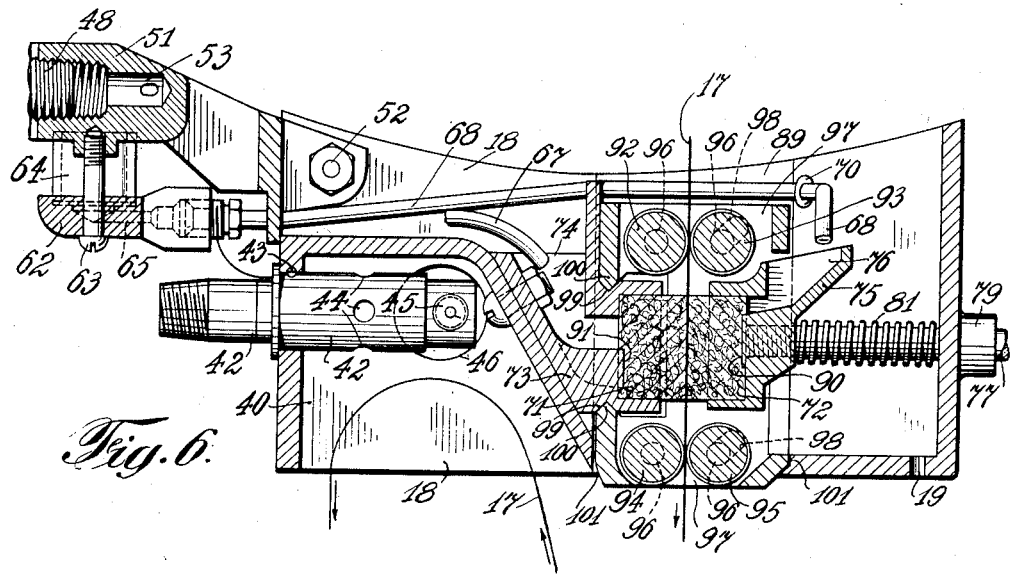

Patented Jan. 7, 1941

2,227,848

UNITED STATES PATENT OFFICE 2,227,848

LIQUID DISTRIBUTING DEVICE

Lester Soman, New York, N. Y., assignor to Film Treatizor Corporation, New York, N. Y., a corporation of Delaware Original application April 11, 1935, Serial No. 15,773. Divided and this application October 20, 1937, Serial No. 170,055

6 Claims. (Cl. 169—2)

My invention relates to liquid distributing devices and refers particularly to devices of the character mentioned especially adapted for employment in motion picture projection machines, although I wish it to be understood that my device is not limited to that particular form of mechanism but may be used with machines adapted for other purposes, this application being a divisional application of my patent application, Serial Number 15,773, filed April 11, 1935, which issued as Patent Serial Number 2,117,828 on May 17, 1938.

It is well known to projectionists and others versed in the practice of the art that a soiled film will result in dimness and lighting irregularities, such as spots and streaks, in the picture on the screen, as well as also disconcerting disturbances in the reproduced sound from a record carried by the film.

Furthermore, as a soiled film enters the projector head gate, some of the grease and dirt will be wiped off, where it will accumulate and harden around the gate entrance, until the entering film is subjected to so much friction as to cause it to break.

It has been found by experience that the only way to assure a clean film in the projector is to cleanse it thoroughly immediately before it reaches the projector intake feed as it travels thereto. Were the film to be cleaned at its take-off from the projector head, then it would accumulate oil and dirt prior to its projection, such as in rewinding, inspecting, cutting and splicing. Similar objectionable results would follow from cleaning the film at some remote point, such as upon a rewinding bench.

It has also been found that the film can be most easily and thoroughly cleaned by wiping it between relatively soft absorbent pads moistened with a suitable liquid, and that the latter can be of a nature which at the same time will render the film more pliable and stronger, while also rendering it less liable to ignition, when thus applied to the film at the projector intake.

The liquid distributing device of my invention is adapted particularly for accomplishing the above described results by moistening the said absorbent pads with a cleansing liquid which may have fire-extinguishing properties, and comprising a new and novel construction for the constant and controllable feed of such liquid to two or more pads and for the combination of said liquid distributing device with special means for feeding said liquid to said liquid distributing device.

The novelty and usefulness of my invention will be evident upon a consideration of my specification and its accompanying drawings in which for clearness of description I show a specific form of roller-bearing and absorbent pad construction, although the particularly shown and described construction of these two elements are not an inventive part of this application.

The device of my invention also includes various features of construction and combinations of parts, as will be evident from the following particular description and appended claims.

One form of my invention is illustrated in the accompanying drawings, in which similar parts are designated by similar numerals.

Figure 4 is an enlarged plan view, partly in horizontal section, of the film-treating part of the device.

Figure 5 is a side elevation of the same.

Figure 6 is a longitudinal vertical section on the line 6—6 of Figure 4.

Figure 7 is a transverse vertical section on the line 7—7 of Figure 4.

Figure 8 is a side elevation of the removed roller carrier, as viewed in section in Figure 6.

Figure 9 is a horizontal section on the line 9—9 of Figure 8.

Figure 1:
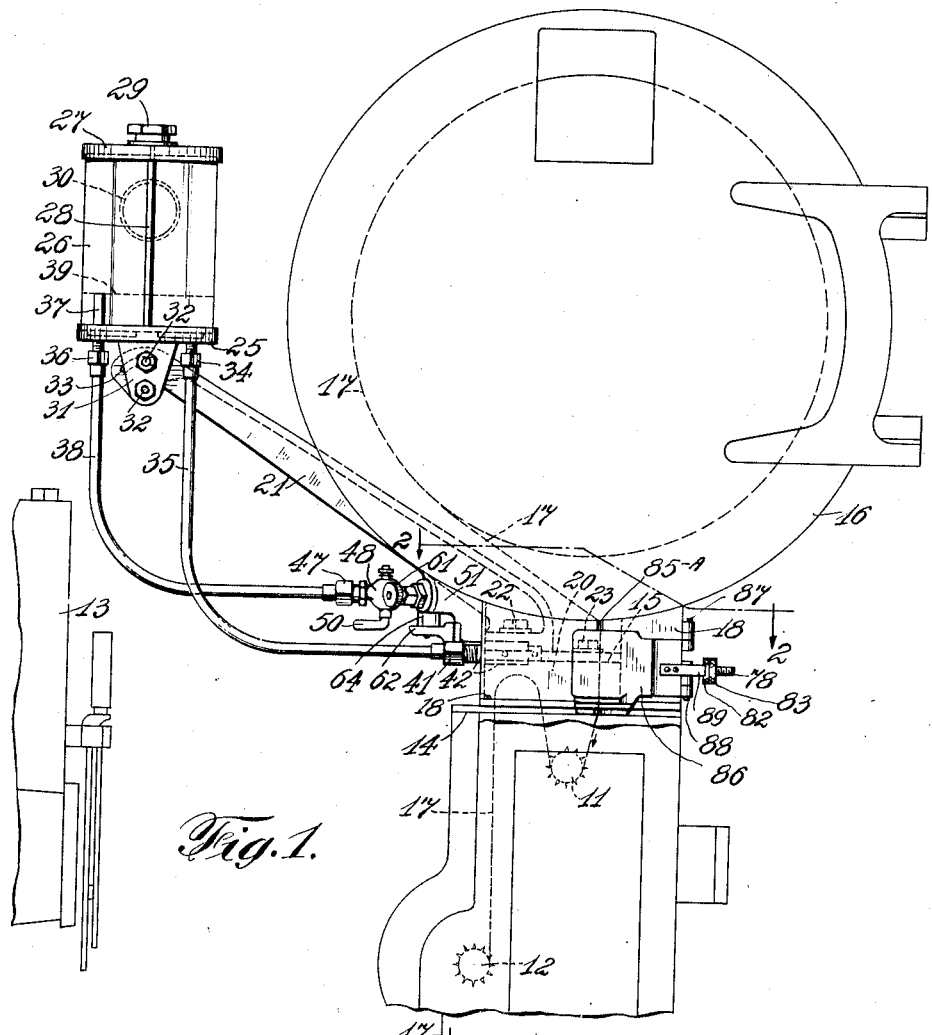
Figure 1 is a broken side elevation showing one form of the device of my invention as mounted upon the top of the casing of a motion picture projector.
Figures 2, 3:
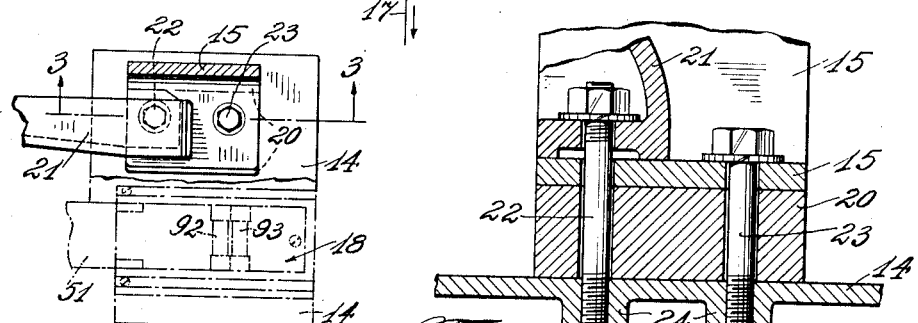
Figure 2 is a broken horizontal section on the line 2—2 of Figure 1.
Figure 3 is an enlarged broken vertical section on the line 3—3 of Figure 2.

A projection machine, irrespective of my invention, commonly has a cradle mounted upon the top plate of its casing just beneath the upper film magazine. As the film is drawn from a reel in this magazine, by the continuously rotated intake sprocket of the projector, it passes between guide rollers journaled in the cradle. Thence, the film forms an upwardly directed loop, from which the film is taken directly by the intermittent feed of the projector.

The partially illustrated projector, many elements and parts of which are not shown, has a commonly employed form of intake feed sprocket 11, intermittent feed sprocket 12, lamp house 13, flat top plate or platform 14, magazine-supporting bracket 15, and upper film-containing magazine 16, from which the film 17 is continuously drawn by the intake sprocket 11, between the liquid-applying cleaning pads embodied in the film-treating device of my invention.

In carrying out my invention, in the particular form of projection device shown in the drawings, there is a cradle 18 which is in general similar to the mentioned usual cradle. It similarly has three apertures 19, 19, 19 in its base or bottom portion by which it is adapted to be similarly secured upon the projector platform plate 14, without the necessity of drilling any new screw holes in the latter for the usual attaching screws. This cradle 18 is of somewhat greater height than the usual cradle, in order to provide adequate space for the cleaning and fire extinguishing elements of my device.

Because of the mentioned height of the cradle 18, a spacer block 20 is interposed between the platform plate 14 and the foot flange of the magazine-carrying bracket 15. A tank-carrying arm 21 has a flanged attaching end abutted upon the top of the foot flange of the bracket 15. The bracket 15 and the arm 21 are fixedly secured in place by means of bolts 22 and 23 which at their lower ends screw into the usual internally formed bosses 24—24 of the platform plate 14, in the same manner as the bolts which have been commonly used for securing the bracket 15 directly to the top plate 14 of the projector, so that thus no new bolt holes or other changes in this top plate are required.

The tank-supporting arm 21 extends rearwardly at an upward inclination and is capable of being swung on the bolt 22 and clamped thereby at different positions of lateral adjustment. The elevated end of the arm 21 carries a tank adapted to contain a supply of suitable liquid having cleansing, preserving, fire resisting and fire extinguishing properties, as to the film.

This tank has a bottom 25, an upright transparent body 26, and a cover 27 indicated as secured to the bottom 25 by means of a tie rod 28, the top 27 having a filling opening closed by a plug 29 carrying a depending ring 30 to prevent its loss.

The tank bottom 25 has a lug 31 by means of which, and a pair of similar bolts 32—32, the tank is mounted upon the rear end of the arm 21. These bolts are parallel, horizontal and extend transversely to the arm 21. One of these bolts forms a pivot for the tank on the arm 21, while the other passes through a slot 33 shown as formed in the arm 21. This arrangement enables the tank to be pivotally adjusted so as to maintain it in an operative upright position with the projection machine tilted to a greater or less extent forwardly and downwardly as usual.

A fire plug 34 is carried by and opens upwardly through the forward margin of the tank bottom 25 closely adjacent to the body 26. This plug 34 forms a connector nipple from which a flexible tube 35 leads downwardly and forwardly to a fire extinguishing nozzle carried by the cradle 18, as will be noted later. It will be noted that the tank can be completely drained of liquid through the connector plug 34.

The tank bottom 25 carries another connector plug 36, shown as disposed at its rear margin and having a tubular inner extension 37 rising to a suitable desired height above the bottom 25. This plug 36 is a service outlet for liquid to be applied to the film. A flexible tube 38 connected thereto leads downwardly and forwardly and is connected to a distributing valve element carried by the cradle 18 and to be described later.

It is to be noted that liquid cannot run out of the tank through the plug 36 after the level of such liquid has descended to the top of the extension tube 37. Thus an emergency supply of the liquid, available for use for fire extinguishing purposes, will always be otherwise retained within the tank. This is indicated by a line 39, which desirably encircles the transparent tank body 26, for convenient observation of the amount of liquid available for film-treating purposes.

A fire extinguishing chamber 40 is formed in the rear and lower portion of the cradle 18. This chamber is open only at the bottom, as will be clear from Figures 4, 5, 6 and 7 taken together, and contains the upper portion of an upwardly directed loose loop of the film 17, as indicated in Figures 1 and 6.

The lower and forward end of the fire extinguisher tube 35 carries a connector 41 by means of which it is attached to the outer end of a fire extinguishing nozzle 42 which extends forwardly through the rear end wall of the cradle 18 into the upper portion of the fire extinguishing chamber 40, where it is shown as removably retained in place by means of a cotter pin 43.

The extinguisher nozzle 42 may be of any known or other suitable internal construction. Suffice it to state that this nozzle contains a temperature-controlled valve mechanism adapted, upon a predetermined rise in temperature, to cause the fire extinguishing liquid to be discharged through a plurality of nozzle openings 44—44. The inner end portion of the nozzle 42 is shown as carrying a heat-sensitive element 45 which is in control of the mentioned valve mechanism. This element can be highly combustible, or readily fusible, or of other suitable temperature-responsive nature.

Should the film 17 become ignited at the projector head, the fire will be extinguished while it is small and prevented from spreading to the film within the cradle 18. In order to assure the quick development of sufficient heat to cause the operation of the fire nozzle 42, a ventilating opening 46 is provided for the fire chamber 40 to allow the escape of the air from fire chamber 40 in cradle 18, thus allowing the flame to be drawn to the element 45.

The lower and forward end of the tube 38 for the film-treating liquid carries a connector 47 by means of which it is attached to a valve body 48 having a turncock valve plug 49 provided with a handle 50 by means of which the supply of treating liquid can be quickly and conveniently turned on or shut off.

The valve body 48 is fixedly carried by and shown as extending into a distributing valve body block 51 which is shown as detachably mounted upon the upper portion of the rear end of the cradle 18 by means of a pair of similar bolts 52—52. The valve body member 51 has therein a central passage 53 in communication outwardly with the turn-cock valve body 48 and closed at its inner end. A pair of smaller similar branch passages 54—54 lead angularly outward laterally from the inner end portion of the main passage 53.

A pair of similar needle valves adjustably control the flow of liquid through the respective branch passages 54—54. For each of the needle valve constructions, a tubular valve casing 55 is fixedly carried by and extends into the main valve body 51, with its bore 56 in communication with a branch passage 54.

The inner end portion of the casing 55 is reduced to form a small annular chamber within the body 51, into which small passages 58—58 through the shell 55 lead from its bore 56. A downward outlet from the annular chamber 57 is formed by means of a drip nipple 59. Flow of liquid through the valve shell 55 can be conveniently adjustably regulated by means of a needle valve stem 60 threaded into its bore 56 and provided with a finger piece 61.

Thus the supply of treating liquid can be controlled by means of the valve plug 49 while preserving the adjustment of the needle valve stems 60—60.

A bottom piece 62 is secured to and may be drawn upwardly toward the lower face of the main valve body 51 by means of a screw bolt 63. This bottom piece 62 clamps in place and forms bottoms for a pair of similar small upright glass sight-feed cylinders 64—64, with their upper ends abutting the lower face of the valve body 51 and surrounding the drip nipples 59—59.

Outlet bores 65—65 lead forwardly from the bottoms of the cylinders 64—64 respectively to the outside of the front of the bottom piece 62. Similar connectors 66—66 respectively connect the rear ends of small service tubes 67 and 68 to the front of the sight-feed bottom piece 62 in communication with its bores 65—65.

These tubes 67 and 68 extend toward the forward end of the cradle 18 within its upper portion. These tubes are of different lengths, the tube 67, adjacent the near side of the cradle 18, being shorter than the tube 68, which is adjacent the far side of the cradle 18. These tubes have open discharge ends turned inwardly and downwardly and serve to deliver the treating liquid at desired points, as described later. The longer tube 68 rests in a notched recess 69 in the inner side of the upper edge of the adjacent side wall of the cradle 18 and is held in place by means of an eye 70 carried by this wall.

The traveling film 17, as it is drawn from the magazine 16 by the continuously rotated projector intake sprocket 11, passes downwardly between and in wiping contact with a pair of opposed similar absorbent pads 71 and 72 which are disposed within the cradle 18. These pads are kept moistened by the film-treating liquid, which they apply and at the same time clean the film 17. Also fire in the film cannot pass them, should it ever reach that point.

The pad 71 in the particular form of device illustrated is seated in a recess or pocket in a stationary pad holder 73 shown as bolted to the cradle 18. The pad holder 73 has through it an upwardly open funnel-shaped passage 74 which terminates downwardly and forwardly against the back of the upper portion of the pad 71. This passageway 74 extends laterally from side to side of the pad holder 73, as is evident from Figures 4 and 6. The shorter liquid-conveying tube 67 discharges into the flaring upper end of the passageway 74 at about a middle point transversely of the cradle 18.

The other pad 72 is similarly carried by a movably mounted pad holder 75 having a substantially similar funnel-shaped passageway 76 terminating against the upper portion of the back of this pad 72 and into which the longer liquid-conveying tube 68 is adapted to discharge.

In the particular illustrated form of my device, the movable pad carrier or holder 75 is rigidly fixed upon the inner or rear ends of stiff rods or stems 77 and 78 which are supported in and slidably extend through similar bearing bosses 79 and 80 provided upon the front end of the cradle 18. Within the cradle 18, the pad holder stems 77 and 78 carry similar thrust springs 81—81 which act between the forward end wall of the cradle 18 and the movable pad carrier 75 to press its pad 72 against the film 17 and the latter against the backing pad 71.

The stem 77 is shown as disposed adjacent the remote side of the cradle 18 and the stem 78 adjacent its near side. The latter stem is longer and outwardly of its bearing 80 carries an adjusting nut 82, by means of which the pressure of the pads 71 and 72 upon the interposed film 17 can be regulated. Adjustment is maintained by means of a jam nut 83 for the adjusting nut 82. Both of these nuts 82 and 83 are shown as being similar flat finger nuts. The other stem 77 is shown as having an outer head 84.

By reason of the stems 77 and 78 being freely slidable through their supporting bearings 79 and 80, it is evident that the pad 72 carried by the pad holder 75 can be freely drawn away from the film 17 against the force of the springs 81—81, without disturbing the adjustment of the nut 82. This of course not only removes the pressure of both pads 71 and 72 upon the film 17 but provides an open space between these pads. If desired the pad holder 75 can be thus moved until its flared upper portions abut against the forward end wall of the cradle 18.

In carrying out my invention, means are provided adapted to maintain the movable pad holder 75, together with the pad 72 carried thereby, at a suitable withdrawn non-operative position, and providing conveniently for its quick return to its operative position, as shown in the drawings. This provides for readily inserting, or adjusting, or removing the film 17.

The illustrated device has, in the near side wall of its cradle 18 a large opening 85 opposite to the pads 71—72 and their holders 73 and 75. This opening extends to the forward end of the cradle and down to the bottom below the holders 73 and 75. The portion of the cradle wall above the opening 85 is provided with a film slit 85A. A door 86 for the opening 85 is hinged upon vertically aligned pintles 87 and 88, carried upon the outer side of the front end wall of the cradle 18, more closely adjacent to the near side of the cradle than the nearby slidable stem 78.

At its hinged end, the door 86 has fixed thereon an outwardly angled projecting finger 89 which extends beyond the hinge pivots 87 and 88. The finger 89 forms a pivotally swinging catch or detent adapted, during the terminal part of the opening movement of the door 86, to be swung thereby into the return path of the adjusting nut 82, at the back thereof, after the pad holder 75 has been drawn a predetermined distance toward this end of the cradle 18, such as by means of the stems 77 and 78.

The pad holder can be set free merely by a closing movement of the door 86, which frees the holding catch 89 from the nut 82. Thus it will be seen that the door 86 forms an operating handle for the catch 89. It is evident that the catch 89 could be of a different form and that if desired it could have a different handle, independently of the door.

Thus the movable pad holder 75, together with its pad 72, can be retracted and thus maintained against the force of the springs 81—81 while still preserving the adjustment of the nut 82.

A substantially central projection 90 is formed on the pad-engaging face of the movable pad holder 75 and a substantially similar projection 91 is formed on the opposed pad-engaging face of the stationary pad holder 73. These projections produce somewhat greater pressure of the cleaning pads 71 and 72 upon the middle portion of the film 17 between its perforated margins.

The film 17, as it is drawn downwardly through the cradle 18, is guided to the pads 71 and 72 by a pair of opposed similar upper rollers 92 and 93 just above the pad holders 73 and 75, and is guided away from the pads by a similar pair of opposed lower rollers 94 and 95 which are disposed just beneath the pad holders. These guide rollers carry removable studs 96—96 by means of which they are mounted in a roller carrier 97, shown as being in the form of a skeleton-like frame.

One of the upper rollers and one of the lower rollers, shown as the rollers 93 and 95, at the right of the film 17 in Figures 4 and 6, have their studs 96—96 journaled in bearing slots 98—98 which incline downwardly and inwardly toward the opposed rollers 92 and 94, thereby causing the downwardly drawn traveling film 17 to draw the opposed guide rollers together upon it, as well as also providing for easier insertion and removal of the film.

The roller carrier 97 is mounted within the cradle 18 for quick and easy removal and replacement, together with the rollers carried thereby, thereby greatly facilitating the cleaning or repairing of the device.

The stationary pad holder 73 is provided with similar upper and lower guide grooves 99—99 forming a horizontal transverse slideway. The roller carrier 97 has opposed upper and lower edges 100—100 respectively slidably fitting into the grooves 99—99. The roller carrier 97 is shown in Figure 6 as extended slightly below the bottom of the bottom of the cradle 18, through a bottom opening 101, where it is further slidably guided.

The near outer end of the roller-carrying frame 97 is provided with a large opening 102 through which the pads 71 and 72 may be inspected or removed, without removing the roller carrier 97 from the cradle 18, if so desired. Vertical slits 103—103 for the removal of the film 17 are provided above and below the opening 102.

When the roller carrier 97 is to be removed from the cradle 18, it is simply slid out through the cradle opening 85, after the movable pad carrier 75 has been latched at retracted position, by the catch 89, with the door 86 open, as described.

It is believed that the operation and manner of use of the device have been already fully described.

It is obvious that various modifications may be made in the construction shown in the drawings and above particularly described, within the principle and scope of my invention as defined in the appended claims.

I do not specifically limit myself to materials, size, shape, particular arrangement and relationship of parts and elements, or minor details of construction and design which may be readily varied, these being given simply as a means for clearly describing the device of my invention.

What I claim is:

1. In a moving picture device, in combination, a film magazine, a projector head, a cradle mounted upon the top of said projector head through which a film is drawn from said film magazine, a liquid container carried by said cradle and positioned above said cradle externally of said magazine, means adapted to distribute a liquid from said container to said cradle including a tube adapted to discharge a portion of said liquid upon said outgoing film from said magazine and within said cradle and a second tube adapted to discharge a portion of said liquid in proximity of said outgoing film after it has been treated with said liquid from said first mentioned tube, the exit opening of said first mentioned tube being above the exit opening of said second tube within said liquid container, independent means externally of said magazine for controlling the amount of liquid passing through said first mentioned tube and heat operative means for opening said second tube.

2. In a moving picture device, in combination, a film magazine, a projector head, a cradle mounted upon the top of said projector head through which a film is drawn from said film magazine, a liquid container carried by said cradle and positioned above said cradle externally of said magazine, means adapted to maintain said liquid container in vertical position irrespective of the position of said projector, means adapted to distribute a liquid from said container to said cradle including a tube adapted to discharge a portion of said liquid upon said outgoing film from said magazine and within said cradle and a second tube adapted to discharge a portion of said liquid in proximity of said outgoing film after it has been treated with said liquid from said first mentioned tube, the exit opening of said first mentioned tube being above the exit opening of said second tube within said liquid container, independent means externally of said magazine for controlling the amount of liquid passing through said first mentioned tube and heat operative means for opening said second tube.

3. In a moving picture device, in combination, a film magazine, a projector head, a cradle mounted upon the top of said projector head through which a film is drawn from said film magazine, a liquid container carried by said cradle and positioned above said cradle externally of said magazine, a lead tube adapted to allow of the flow of a portion of said liquid from within said container, two distributing tubes adapted to distribute said liquid to said outgoing film from said magazine and within said cradle, Siamese valves connecting said lead tube with said distributing tubes and adapted to control the flow of liquid within said distributing tubes, a second lead tube adapted to distribute a portion of said liquid from said liquid container, to a temperature-controlled valve in said cradle in proximity of said outgoing film after it has been treated with said liquid from said distributing tubes, a temperature-controlled valve carried by said second lead tube, the entrance opening of said first mentioned lead tube being above the entrance opening of said second mentioned lead tube within said liquid container, independent means externally of said magazine for controlling the amount of said liquid passing through said distributing tubes, and heat operative means for opening said temperature-controlled valve.

4. In a moving picture device, in combination, a film magazine, a projector head, a cradle mounted upon the top of said projector head through which a film is drawn from said film magazine, a liquid container carried by said cradle and positioned above said cradle externally of said magazine, means adapted to maintain said liquid container in vertical position irrespective of the position of said projector, a lead tube adapted to allow of the flow of a portion of said liquid from within said container, two distributing tubes adapted to distribute said liquid to said outgoing film from said magazine and within said cradle, Siamese valves connecting said lead tube with said distributing tubes and adapted to control the flow of liquid within said distributing tubes, a second lead tube adapted to distribute a portion of said liquid from said liquid container, to a temperature-controlled valve in said cradle in proximity of said outgoing film after it has been treated with said liquid from said distributing tubes, a temperature-controlled valve in said cradle, the entrance opening of said first mentioned lead tube being above the entrance opening of said second mentioned lead tube within said liquid container, independent means externally of said magazine for controlling the amount of said liquid passing through said distributing tubes, and heat operative means for opening said temperature-controlled valve.

5. In a moving picture device, in combination, a film magazine, a projector head, a cradle mounted upon the top of said projector head through which a film is drawn from said film magazine, a plurality of rollers within said cradle abutting upon said film during its passage through said cradle, a liquid container carried by said cradle and positioned above said cradle externally of said magazine, means adapted to distribute a liquid from said container to said cradle including a tube adapted to discharge a portion of said liquid upon said outgoing film from said magazine and within said cradle and a second tube adapted to discharge a portion of said liquid in proximity of said outgoing film after it has been treated with said liquid from said first mentioned tube, the exit opening of said first mentioned tube being above the exit opening of said second tube within said liquid container, independent means externally of said magazine for controlling the amount of liquid passing through said first mentioned tube and heat operative means for opening said second tube.

6. In a moving picture device, in combination, a film magazine, a projector head, a cradle mounted upon the top of said projector head through which a film is drawn from said film magazine, a plurality of rollers within said cradle abutting from said film during its passage through said cradle, a liquid container carried by said cradle and positioned above said cradle externally of said magazine, means adapted to maintain said liquid container in vertical position irrespective of the position of said projector, means adapted to distribute a liquid from said container to said cradle including a tube adapted to discharge a portion of said liquid upon said outgoing film from said magazine and within said cradle and a second tube adapted to discharge a portion of said liquid in proximity of said outgoing film after it has been treated with said liquid from said first mentioned tube, the exit opening of said first mentioned tube being above the exit opening of said second tube within said liquid container, independent means externally of said magazine for controlling the amount of liquid passing through said first mentioned tube and heat operative means for opening said second tube.

LESTER SOMAN.